US008451986B2

(12) United States Patent
Cohn et al.

(10) Patent No.: US 8,451,986 B2
(45) Date of Patent: May 28, 2013

(54) METHOD AND SYSTEM FOR AUTOMATICALLY PROVIDING ALTERNATE NETWORK ACCESS FOR TELECOMMUNICATIONS

(75) Inventors: Alan Wade Cohn, Austin, TX (US); Ronald E. Battles, Cedar Park, TX (US); David Proft, Austin, TX (US); Scott William Shumate, Austin, TX (US)

(73) Assignee: iControl Networks, Inc., Redwood City, CA (US)

( * ) Notice: Subject to any disclaimer, the term of this patent is extended or adjusted under 35 U.S.C. 154(b) by 1171 days.

(21) Appl. No.: 11/738,862

(22) Filed: Apr. 23, 2007

(65) Prior Publication Data
US 2008/0261515 A1    Oct. 23, 2008

(51) Int. Cl.
*H04M 11/04* (2006.01)
(52) U.S. Cl.
USPC ...... 379/40; 379/42; 379/220.01; 340/539.14
(58) Field of Classification Search
USPC ........... 709/224, 238, 217; 370/352; 379/325, 379/40, 42, 220.01; 340/539.14; 455/404.1
See application file for complete search history.

(56) References Cited

U.S. PATENT DOCUMENTS

| | | | |
|---|---|---|---|
| 4,951,029 A | 8/1990 | Severson | 340/506 |
| 5,134,644 A | 7/1992 | Garton et al. | 379/39 |
| 5,438,607 A | 8/1995 | Przygoda, Jr. et al. | 379/38 |
| 5,499,014 A | 3/1996 | Greenwaldt | 340/539 |
| 5,625,338 A | 4/1997 | Pildner et al. | 340/539 |
| 5,717,379 A | 2/1998 | Peters | 340/539 |
| 5,777,551 A | 7/1998 | Hess | 340/541 |
| 5,892,442 A | 4/1999 | Ozery | 340/539 |
| 5,943,394 A | 8/1999 | Ader et al. | 379/40 |
| 6,032,036 A | 2/2000 | Maystre et al. | 455/404 |
| 6,038,289 A | 3/2000 | Sands | 379/26 |
| 6,049,272 A | 4/2000 | Lee et al. | 340/539 |
| 6,049,273 A | 4/2000 | Hess | 340/539 |
| 6,052,052 A | 4/2000 | Delmonaco | 340/539 |
| 6,067,346 A | 5/2000 | Akhteruzzaman et al. | 379/39 |
| 6,433,683 B1 | 8/2002 | Robinson | 340/540 |
| 6,661,340 B1 | 12/2003 | Saylor et al. | 340/517 |
| 6,693,545 B2 | 2/2004 | Brown et al. | 340/573 |
| 6,956,477 B2 | 10/2005 | Chun | 340/541 |
| 7,053,764 B2 | 5/2006 | Stilp | 340/506 |
| 7,248,161 B2 | 7/2007 | Spoltore et al. | 340/539.14 |
| 2003/0061344 A1 | 3/2003 | Monroe | 709/224 |
| 2003/0062997 A1 | 4/2003 | Naidoo et al. | 340/531 |
| 2005/0024203 A1 | 2/2005 | Wolfe | 340/539.22 |
| 2005/0216580 A1 | 9/2005 | Raji et al. | 709/223 |
| 2006/0282886 A1* | 12/2006 | Gaug | 726/5 |
| 2007/0226182 A1 | 9/2007 | Sobotka et al. | 707/3 |
| 2008/0091793 A1* | 4/2008 | Diroo et al. | 709/217 |
| 2008/0240372 A1* | 10/2008 | Frenette | 379/40 |

* cited by examiner

*Primary Examiner* — Gerald Gauthier
*Assistant Examiner* — Simon King
(74) *Attorney, Agent, or Firm* — Gregory & Sawrie, LLP

(57) ABSTRACT

A communications unit is provided that can be coupled to a building's telecommunication wiring to provide an automated mechanism for isolating the building's wiring from a PSTN, while also providing a telecommunications connection to an alternative communications network via, for example, broadband or cellular networks. The communications unit can further be configured to be coupled to an alarm controller unit of a security system, thereby permitting the security system to communicate with a remote server system without loss of alarm data. The communications unit can also be configured to permit the legacy security system to provide normal disconnect functionality of building telephones from an outgoing telecommunications line while an alarm condition is present.

7 Claims, 4 Drawing Sheets

METHOD AND SYSTEM FOR AUTOMATICALLY PROVIDING ALTERNATE NETWORK ACCESS FOR TELECOMMUNICATIONS

FIELD OF THE INVENTION

The present invention relates to the field of telecommunications, and more particularly relates to a mechanism for automatically decoupling a building's telephone wiring from a public switched telephone network in order to provide broadband or cellular telephone access.

BACKGROUND OF THE INVENTION

Security systems alert occupants of a dwelling and emergency authorities of a violation of premises secured by the security system. A typical security system includes a controller connected by wireless or wired connections to sensors deployed at various locations throughout the secured dwelling. In a home, sensors are usually deployed in doorways, windows, and other points of entry. For example, motion sensors can be placed strategically within the home to detect unauthorized movement, while smoke and heat sensors can detect the presence of fire.

Security systems are usually connected to a central monitoring service system via a telecommunications line coupled to a public switched telephone network (PSTN). The central monitoring service system can be maintained by a security service provider and continuously monitors all activated subscriber security systems for alarms. Sensor activity occurs when a sensor detects, for example, an opening of a door or window, or presence of movement, or a fire. Sensor activity causes the sensor to send a signal to the controller of the security system. Responsive to receiving the signal, the controller can determine whether the signal represents an alarm condition and, if so, issue an audible alarm to alert the occupants of the dwelling and can originate a data transmission to the central monitoring service system via the telecommunications line. Upon receiving notification of an alarm, the central monitoring service system can determine the type of activity, attempt to contact the dwelling occupants, and alert appropriate authorities of an emergency situation.

Typically, the telecommunications line interconnecting the security system to the central monitoring service system is the dwelling occupant's telephone line. This line usually emanates and is accessible from the exterior of the dwelling. It is this telecommunications line which delivers a security breach signal to the central monitoring service system via a PSTN.

FIG. 1 is a simplified block diagram illustrating a typical connection between a PSTN and a security system. Building 100 is coupled to PSTN 110 via a network interface device (NID) 120. Typically, NID 120 demarcs the hardware associated with PSTN 110 and the hardware (e.g., building wiring) associated with building 110. When building 100 has a security system, or is configured to accommodate a security system, NID 120 is coupled via building wiring (e.g., twisted pair) to an RJ31X jack 130. The RJ31X jack is typically inserted between an NID and the first telephone jack within a building. An alarm controller unit 140 for a security system can be coupled to the building wiring via RJ31X jack 130. As will be discussed more fully below, this permits a security system to disconnect phones in the building (e.g., coupled to telephone jacks 150-180) in order to transmit an alarm signal to a central monitoring service system via PSTN 110. An RJ31X jack also allows a building's phone system to behave normally if a security system is not connected to the RJ31X jack.

FIG. 2 is a simplified block diagram illustrating an example of a typical voice over Internet protocol (VOIP) connection to a building's telephone wiring. Building 100 is still configured to be coupled to PSTN 110 via NID 120 which is then coupled to RJ31X jack 130. RJ31X jack 130 has connections to both an alarm controller unit 140 and a set of connected phone jacks 150-180 (e.g., in a daisy-chain configuration). FIG. 2 illustrates that a telephone jack 180 is further coupled to an analog telephone adapter (ATA) 210. ATA 210 converts telephone analog signals to digital signals that can be transmitted on a broadband network (e.g., Internet 230). ATA 210 is coupled to a broadband modem 220 (e.g., a cable modem or DSL modem) which is further coupled to a wide area network such as Internet 230. In order for a proper installation of VOIP telecommunications, building 110 should be disconnected from PSTN 110 in order to avoid, for example, improper voltages associated with VOIP from being transmitted onto PSTN 110. Disconnecting is typically performed at NID 120 by manually disconnecting a linkage between PSTN 110 and the building wiring at a demarc point within NID 120. One drawback of a typical VOIP connection is that severing the connection between building 100 and PSTN 110 typically requires a service visit by a representative of the provider of PSTN 110 to perform the disconnection.

Another drawback of a VOIP connection such as that illustrated in FIG. 2 is alarm controller unit 140 cannot perform the task of disconnecting the home phones prior to sending out an alarm signal. This is because the security system is no longer between the building telephone wiring and the external telecommunications network. A further disadvantage of using a legacy security system in a VOIP environment is that such security systems are typically unreliable in a VOIP environment. VOIP data compression as well as multiple analog-to-digital and digital-to-analog conversions typically involved in VOIP transmission can distort alarm signals sent by a security system, thereby making them unusable by the central monitoring service system.

It is therefore desirable to provide a solution in which a legacy security system can function in a VOIP environment without loss of data. It is further desirable to provide a mechanism by which a switch over from PSTN-based telecommunications to an alternative technology-based telecommunication (e.g., broadband or cellular) can be provided without having a person manually disconnect a building from a PSTN by severing a connection within an NID.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a communications unit that can be coupled to a building's telecommunication wiring to provide an automated mechanism for isolating the building's wiring from a PSTN, while also providing a telecommunications connection to an alternative communications network via, for example, broadband or cellular networks. Embodiments of the present invention can be configured to be coupled with an alarm controller unit of a legacy security system, thereby permitting the legacy security system to communicate with a remote server system without loss of alarm data. Embodiments of the invention will also permit the legacy security system to provide normal disconnect functionality of building telephones from an outgoing telecommunications line while an alarm condition is present.

Figure 1:
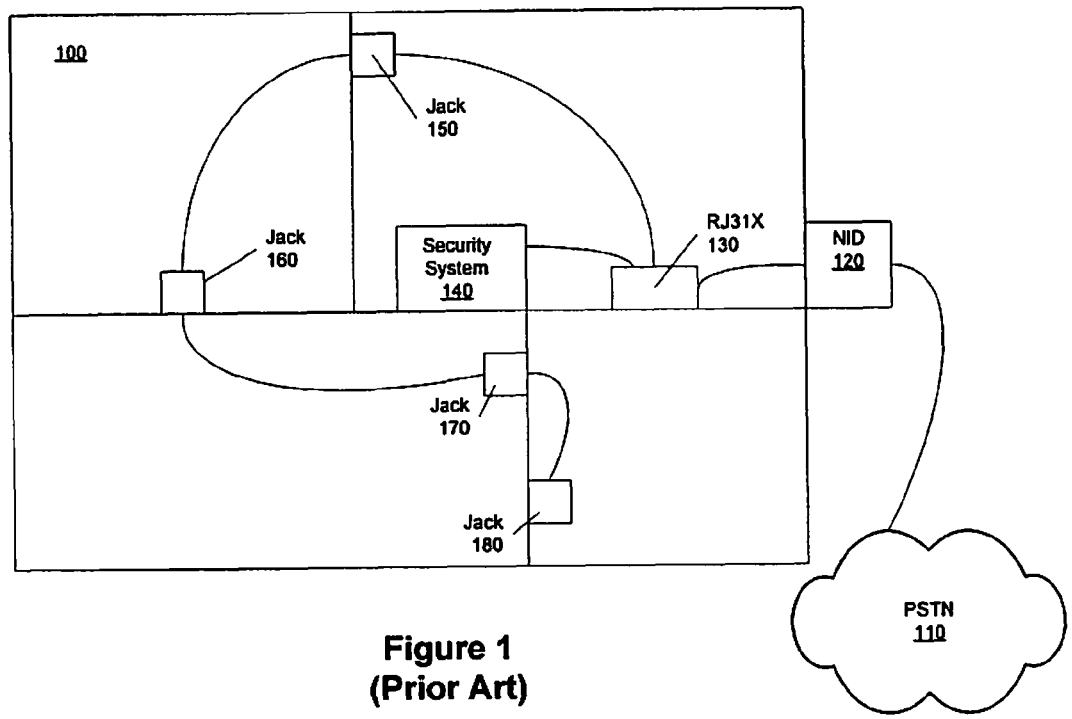
FIG. 1 is a simplified block diagram illustrating a typical connection between a public switched telephone network (PSTN) and a building security system.
Figure 2:
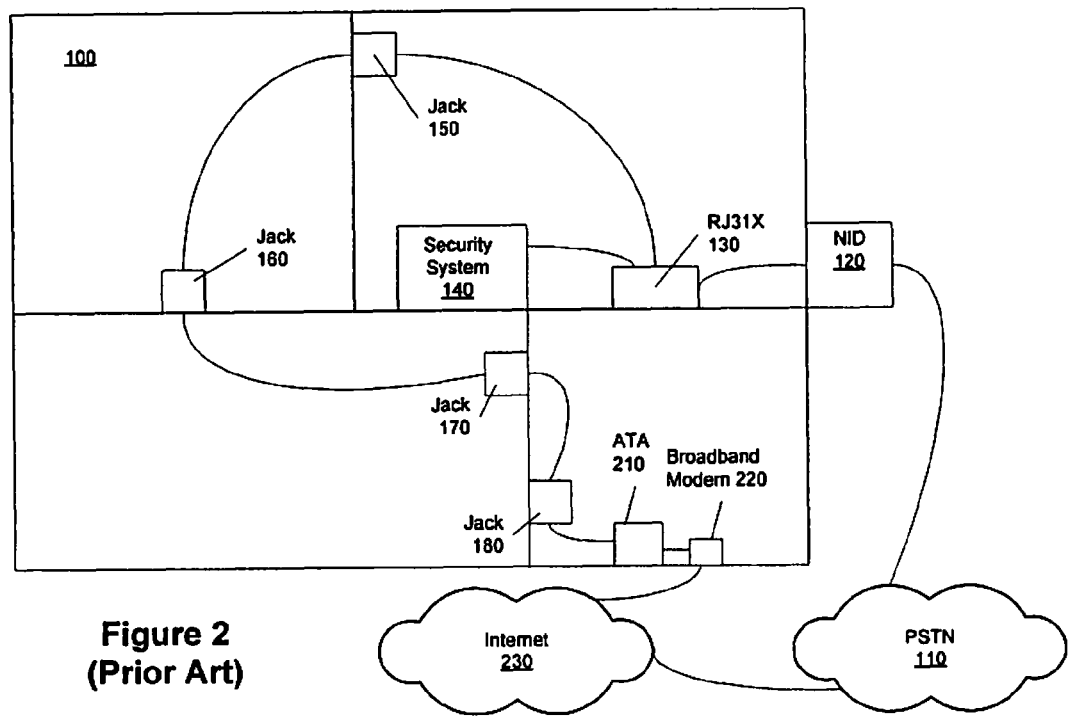
FIG. 2 is a simplified block diagram illustrating an example of a typical voice over Internet protocol (VOIP) connection to a building's telephone wiring.
Figure 3:
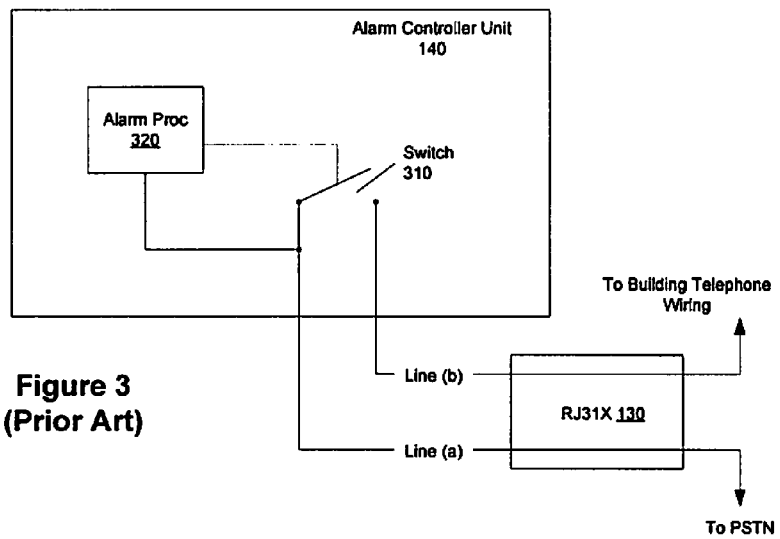
FIG. 3 is a simplified block diagram illustrating an example of typical telecommunications connections between an RJ31X jack and an alarm controller unit for a legacy security system.

FIG. 3 is a simplified block diagram illustrating some of the telecommunications connections between an RJ31X jack 130 and an alarm controller unit for a legacy security system 140. As discussed above, RJ31X jack 130 is coupled to building wiring between a PSTN and the telephone jacks within the building. As illustrated in FIG. 3, Line (a) is coupled through RJ31X jack to the PSTN (via an NID), while Line (b) is coupled through the RJ31X jack to the building telephone jacks. If no security system were present, the RJ31X jack would short Lines (a) and (b) together thereby allowing the building telephone wiring to communicate with the PSTN.

As illustrated in FIG. 3, Lines (a) and (b) enter alarm controller unit 140 and are coupled to an automated switch 310. Automated switch 310 is controlled by alarm processor 320. Alarm processor 320 is also connected via Line (a) to the PSTN. When no alarm is present, alarm processor 320 places switch 310 in a closed state, thereby allowing normal telecommunications operations between the building telephone wiring and the PSTN. During an alarm condition, alarm processor 320 sets switch 310 in an open state, thereby disconnecting any telephones connected to the building phone jacks from the PSTN. Such a disconnection prevents an intruder in the building from stopping an alarm dial out by raising a handset on a phone. Once switch 310 is placed in an open state, alarm processor 320 can dial out an alarm signal on Line (a) to a central monitoring service system coupled to the PSTN.

Figure 4:
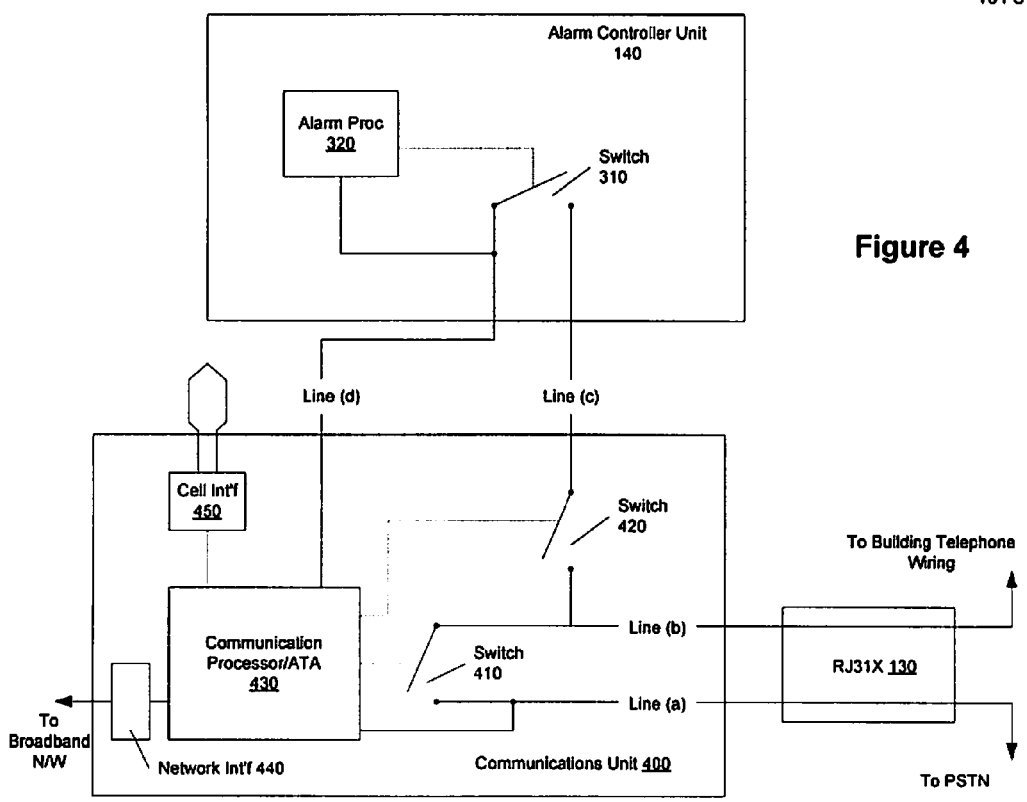
FIG. 4 is a simplified block diagram illustrating a communications unit configured to provide alternate network connectivity in accord with embodiments of the present invention.

FIG. 4 is a simplified block diagram illustrating a communications unit 400 configured to provide alternate network connectivity in accord with embodiments of the present invention. Lines (a) and (b) are provided from RJ31X jack 130 to communications unit 400. Line (a) is connected through RJ31X jack 130 to a PSTN, while Line (b) is connected through the RJ31X jack to building telephone wiring. Lines (a) and (b) are coupled to a switch 410 which is controlled by Communication Processor/ATA 430. Line (b) is also coupled to a switch 420, which is also controlled by Communication Processor/ATA 430. Line (c) is coupled to both switch 420 and switch 310 in alarm controller unit 140 (discussed above with regard to FIG. 3). Thus, Line (c) in FIG. 4 corresponds to Line (b) illustrated in FIG. 3 with regard to switch 310. As with FIG. 3, switch 310 is controlled by alarm processor 320. The other pole of switch 310 is coupled via Line (d) to Communication Processor/ATA 430. Thus, Line (d) in FIG. 4 corresponds to Line (a) of FIG. 3 and Communication Processor/ATA 430 can be configured to provide responses to alarm processor 320 that would be expected from the PSTN over Line (d).

Communication Processor/ATA 430 can be configured to provide a plurality of outbound communication modes. As illustrated, Communication Processor/ATA 430 is coupled to Line (a) to enable provision of an outgoing PSTN connection. Communication Processor/ATA 430 is further coupled to a network interface 440, which enables provision of a two-way communication to a broadband network. For example, network interface 440 can be an Ethernet interface which is further coupled to a broadband modem (not shown). Alternatively, network interface 440 can be a broadband modem itself, which is then coupled to a broadband connection leaving the building. Communication Processor/ATA 430 can be further connected to a cellular interface 450 for communication to a private cellular network (not shown) that can ultimately give a connection to an external network (also not shown). As will be discussed below, use of a broadband connection or a cellular connection can provide an alarm signal to a remote server system coupled to an external network, such as the Internet.

Switches 410 and 420 are configured to be placed in an opened or closed state depending upon the desired communications mode. For example, if the building's telephone system is to be connected to the PSTN, then switch 410 is placed in a closed state by Communication Processor/ATA 430, while switch 420 is placed in an open state. Even though no communication signal is provided over Line (c) to alarm controller unit 140, the legacy security system continues to function in response to an alarm condition as previously discussed. That is, switch 310 is held in a closed state until an alarm condition is detected by alarm processor 320. Upon detection of an alarm condition, switch 310 is placed in an open state and alarm processor 320 transmits an alarm signal along Line (d) to Communication Processor/ATA 430, which can respond to the alarm processor in a manner that simulates an expected response from the PSTN. As discussed more completely below, Communication Processor/ATA 430 can interpret the alarm signal and in turn transmit the alarm signal on a selected communication path.

If the selected communication path is PSTN, then Communication Processor/ATA 430 can place switch 410 in an open state and transmit the alarm signal along Line (a) to the PSTN in a manner similar to that of the alarm controller unit 140. If the selected communication mode is broadband, then Communication Processor/ATA 430 can interpret the alarm signal and transmit an appropriate data stream through network interface 440 to a remote server system coupled to the broadband network. Similarly, Communication Processor/ATA 430 can transmit an appropriately formatted data stream to a cellular network via cell interface 450. In either the broadband or cellular configuration, switch 410 does not need to be opened because use of the building phone system will have no affect on outgoing communication.

Communications unit 400 can also be configured to provide alternate network access for building telephones, such as VOIP or cellular telephone. Again, configuration of switches 410 and 420 provides this access. For a VOIP/cellular telephone configuration, switch 410 is placed in an open state by Communication Processor/ATA 430. By opening switch 410, this effectively isolates the building telephone wiring (coupled via Line (b)) from the PSTN (coupled via Line (a)). In addition, switch 420 is placed in a closed state by Communication Processor/ATA 430. Thus, signals from telecommunication devices coupled to building telephone jacks arrive at communications unit 400 through Line (b), pass through switch 420, continue along Line (c) to alarm controller unit 140, pass through switch 310 (which is held in a closed state when no alarm is present) and are provided to Communication Processor/ATA 430 via Line (d). Communication Processor/ATA 430 can then process the analog telephone signals (e.g., in a manner standard for VOIP) in preparation to be transmitted to the broadband network coupled to network interface 440. Alternatively, Communication Processor/ATA 430 can process the analog signals received on Line (d) in a manner appropriate for transmission via cellular interface 450, if cellular telephone connectivity is desired.

In the configuration allowing alternate telecommunications network access discussed above, upon detection of an alarm condition by alarm controller unit 140, alarm processor 320 places switch 310 in an open state, thereby disconnecting the building telephones, and then transmits alarm condition information on Line (d) to Communication Processor/ATA 430, which will then transmit the alarm information along the selected communication path. It should be noted, that because the PSTN does not need to be disconnected at the NID, if PSTN service is still otherwise available, then Communication Processor/ATA 430 can transmit alarm information out along Line (a) to a central monitoring service system over the PSTN, while still being configured to provide alternate network access for telecommunications from the building phone system. By holding switch 410 in an open state, communications unit 400 isolates the building telephone wiring from the PSTN.

As will be discussed with regard to an embodiment below, communications unit 400 can be configured to be in communication with a remote server system over an external network. This communication mode is bidirectional, thereby allowing control information to be provided to the communications unit and any security system coupled to the communications unit. Control information can be sent by the remote server system to the communications unit 400 directing Communication Processor/ATA 430 to operate in a selected mode (i.e., PSTN, VOIP, and cellular telephone). Thus, a user of communications unit 400 can contact a provider of the remote server system and request, for example, VOIP service to be activated on communications unit 400. A signal can then be sent by the remote server system instructing the communications unit to configure switches 410 and 420 in a manner appropriate to the selected mode and all configuration necessary for that mode is provided without further user interaction.

It should be noted that such reconfiguration of a building phone system between one of a variety of modes can be done much more efficiently than traditional methods. This is due, in part, to disconnection and reconnection to the PSTN not requiring manual disconnection of circuits at the NID.

It should further be noted that while the above discussion illustrates a connection to alarm controller unit 140, no security system is necessary to the alternate network access provision of the present invention. Lines (c) and (d) can, for example, be shorted together to provide a circuit between switch 420 and Communication Processor/ATA 430. In such a configuration, Communication Processor/ATA 430 can provide just the switch configuration control and any necessary data conversion between the analog signal from the building telephone system to the chosen external network.

Example Embodiment of Communications Unit

Figure 5:
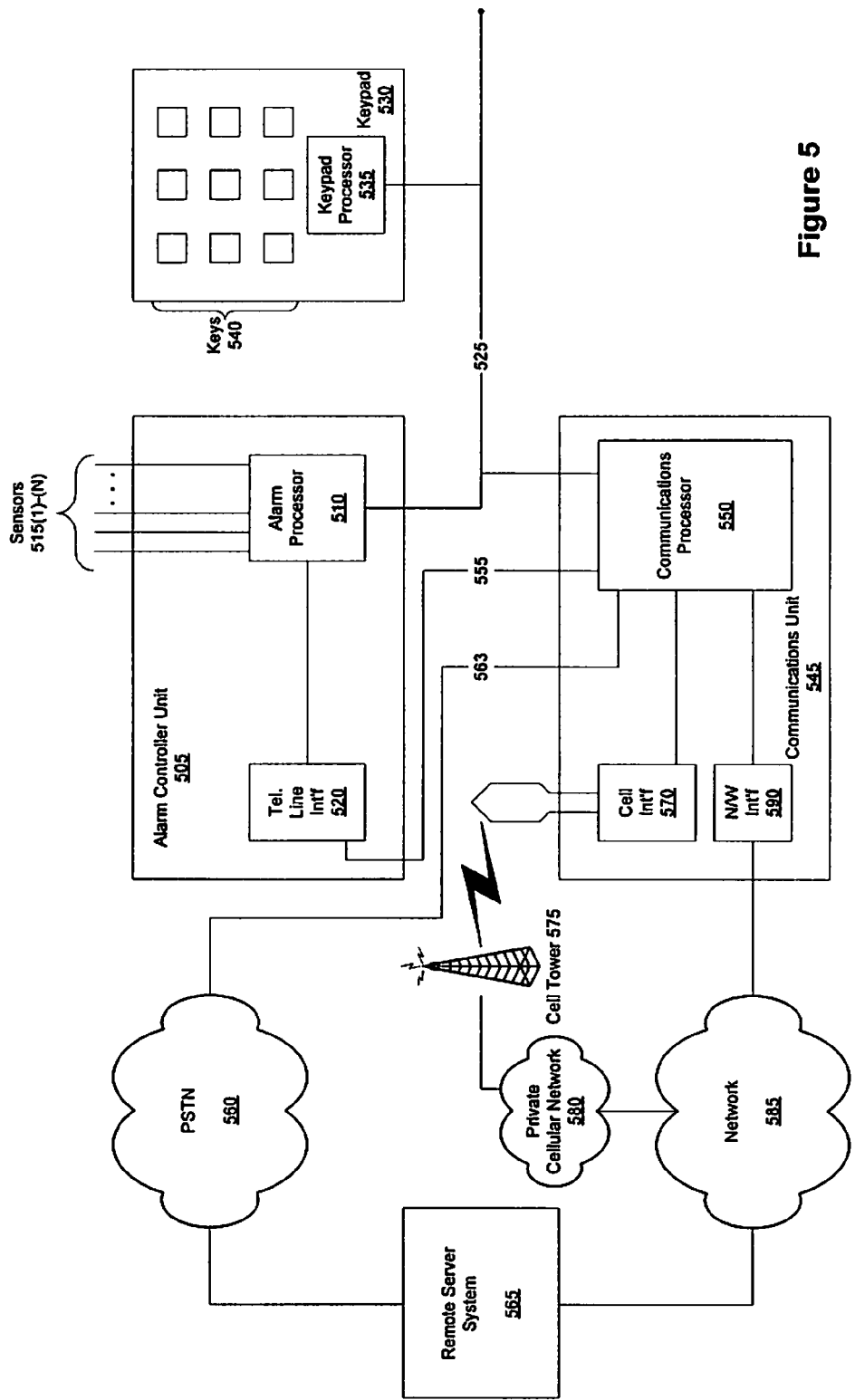
FIG. 5 is a simplified block diagram of components of an alarm system controller unit coupled to a communications unit in accord with embodiments of the present invention.

FIG. 5 is a simplified block diagram of components of a legacy alarm system coupled to a communications unit in accord with embodiments of the present invention. Alarm controller unit 505 includes an alarm processor 510 (e.g., a microprocessor) coupled to sensors 515(1)-(N). Alarm processor 510 is coupled via keypad bus 525 to keypad processor 535 within keypad 530. Keypad 530 includes keys 540 through which control codes can be entered to alarm processor 510. Communications unit 545 provides a communications processor 550 that is coupled to alarm processor 510 and keypad processor 535 via keypad bus 525. Thus, communications processor 550 can exchange data with alarm processor 510 using a serial digital protocol of keypad bus 525. Communications processor 550 can be configured to automatically determine the type of serial digital protocol being used in communications between alarm processor 510 and keypad processor 535 as part of an initial configuration of communications unit 545 upon being coupled to the keypad bus.

Communications processor 550 is also coupled to alarm controller unit 505 via telecommunications link 555, which is coupled to the outgoing port of telephone line interface 520. Telecommunications link 555 corresponds to Line (d) of FIG. 4, wherein switch 310 of FIG. 4 is embodied within telephone line interface 520. Communications processor 550 is further coupled to PSTN 560 by telecommunications link 563. Telecommunications link 563 corresponds to Line (a) of FIG. 4, wherein communications processor 550 corresponds to Communications Processor/ATA 430 of FIG. 4. Communications processor 550 then serves as an intermediary between alarm controller unit 505 and PSTN 560. It is through this link that communications processor 550 can provide communication from alarm controller unit 505 to a remote server system 565 via the PSTN, should that be a selected communication mode (as described below).

Remote server system 565 can be a network-coupled computer system that provides, in part, responsive communication to information received from communications unit 545. Such responsive communication can be provided to, for example, the user of the alarm system (e.g., a homeowner) or to emergency responders to alarm conditions. Remote server system 565 can also provide communication to communications unit 545, including, for example, updates and configuration information such as telecommunications configuration information discussed above with respect to FIG. 4.

Communications processor 550 can also be coupled to a cellular interface 570 that can provide cellular transmission to a cell tower 575 that is also coupled, directly or indirectly, to a private cellular network 580, which is further coupled to a network 585. Through this link, communications processor 550 can provide a cellular transmission communication mode to server system 565, which is also coupled to network 585, or cellular telephone connectivity as discussed above with respect to FIG. 4.

Communications processor 550 can also be coupled to a network interface 590. Network interface 590 can provide a broadband connection to network 585 (e.g., the Internet), which is also coupled to server system 565. Through network interface 590, communications processor 550 can provide a broadband communications mode to server system 565, or VOIP-type telecommunications for building telephone systems.

In alternate embodiments of communications unit 545, communications processor 550 can be coupled to other communication interfaces that can provide wireless broadband, and the like.

Communications processor 550 can monitor all of the available communication modes to determine which communication mode is the best for transmitting security system data to and from server system 565 at any point in time. For example, the communications processor, through network interface 590, can monitor whether there is an active connection to network 585. Such monitoring can be performed by, for example, by periodically establishing, or attempting to establish, a connection with server system 565 and monitoring a heartbeat signal. Alternatively, the communications processor can determine availability and viability of a network connection to the server system using, for example, network echo packets (e.g., pinging). Similarly, through cellular interface 570, communications processor 550 can periodically establish, or attempt to establish, a connection with server system 565 through private cellular network 580 and network 585. With regard to connections via PSTN 560, the communications processor can, for example, determine whether there is an appropriate voltage over the telecommunications link 563 from the PSTN. In an event of a voltage drop on telecommunications link 563, the communications processor can interpret such a drop as an event that needs to be communicated to the remote server (over either the broadband or cellular connection).

As the communications processor determines the best communication mode for security system information, that mode is then used for communication between communication unit 545 and server system 565 until a determination is made that an alternate communication mode is more appropriate. Alternatively, the communications processor can be configured to give primary preference to a particular communications mode (e.g., broadband), and then secondary preference to a different communications mode (e.g., cellular), and so on. In such a case, the communications processor will use the primary communications mode for transmitting and receiving security system information unless that communications mode is unavailable and then switch to a secondary (or lower) communications mode, depending upon availability of that mode.

As stated above, communications processor 550 and alarm controller unit 505 are coupled over telecommunications link 555 in order for the communications processor to function as an intermediary between the alarm controller unit and PSTN 560. In a legacy system, when alarm processor 510 detects an alarm situation, alarm processor 510 instructs telephone line interface 520 to dial out over PSTN 560 to communicate with the central monitoring service system. As discussed above, at substantially the same time, alarm processor 510 also instructs the telephone line interface to disconnect building telephones from the line (e.g., by setting switch 310 to an open state). Communications processor 550 can simulate the phone service and the central monitoring system and interpret the alarm signals provided by alarm processor 510. Alarm processor 510 provides such communication using, for example, a ContactID format. Communications processor 550 can read the data supplied by alarm processor 510 over the telecommunications link, interpret that data, and transmit an appropriate signal over the chosen communication mode to server system 565.

Communications processor 550 can also interpret signals provided by alarm processor 510 over keypad bus 525, and provide that information to server system 565 over the chosen communication mode. As stated above, such information can include arm/disarm indicators, zone trip information, system trouble (e.g., low battery, clock reset, no power), and the like.

Communications processor 550 can also receive information provided by server system 565 over a communication mode selected by the server system. Communications processor 550 can interpret that received information and format the information for the appropriate serial digital protocol of keypad bus 525. Communications processor 550 can then provide the information to alarm processor 570 over keypad bus 525. Through such communication, communications processor 550 emulates keypad communication to alarm processor 510. Thus, there is no need to reprogram the legacy alarm system to allow the legacy alarm system to be controlled through communication unit 545.

Example Configuration Process

Figure 6:
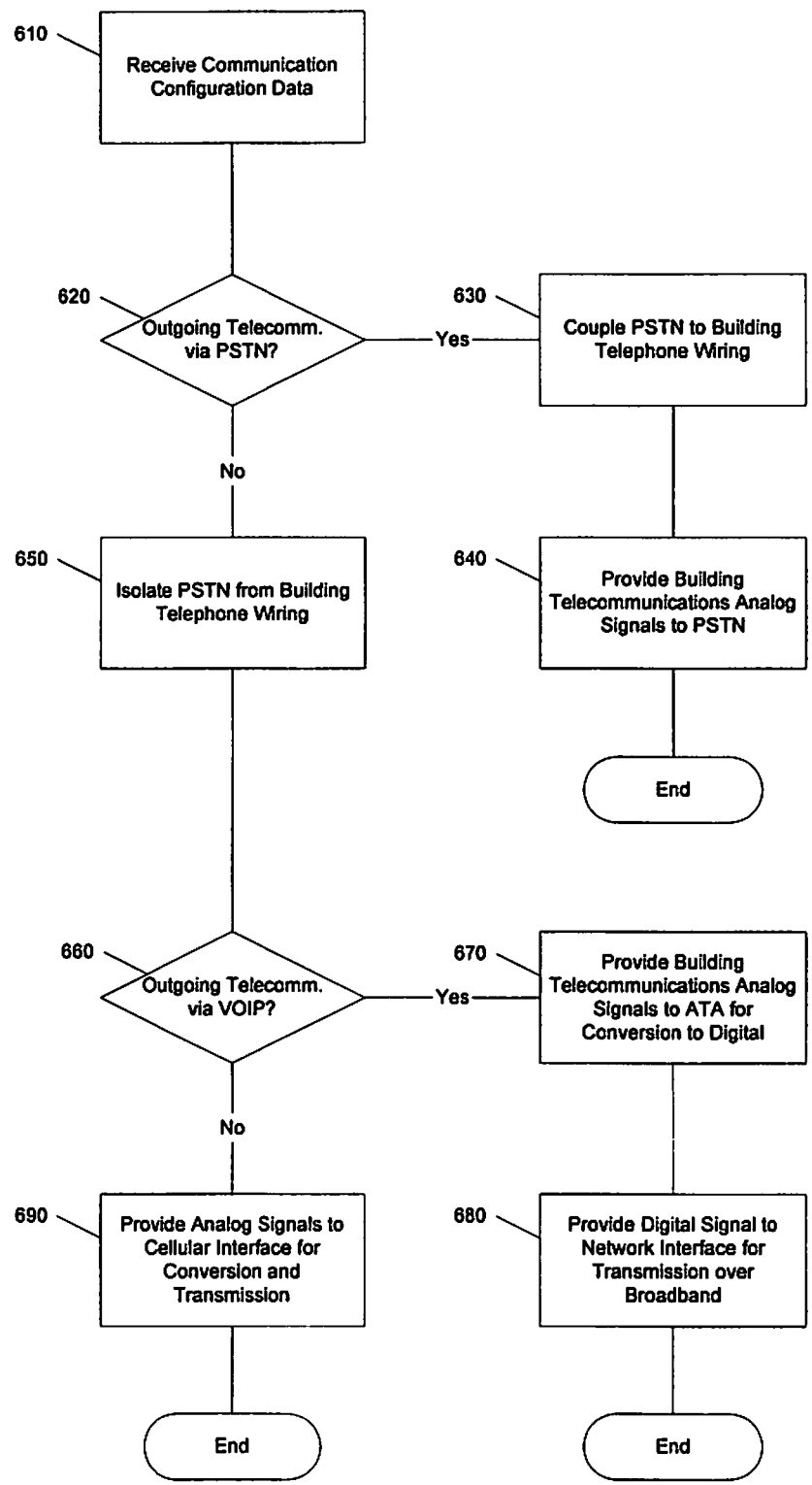
FIG. 6 is a simplified flow diagram illustrating an example of a process for configuring a communications unit to provide alternative telecommunication modes in accord with embodiments of the present invention.

FIG. 6 is a simplified flow diagram illustrating an example of a process for configuring a communications unit (e.g., 400) in accord with embodiments of the present invention. A communications unit receives configuration data (610), for example, from a remote server system. The communications unit can then determine whether the configuration requires outgoing telecommunication via PSTN (620). If the configuration is for PSTN-based communication, then the communications unit couples the PSTN to the building telephone wiring (630). As discussed above, such a coupling can be accomplished, for example by placing switch 410 in a closed state. Analog signals received from the building telephone wiring can then be provided to the PSTN (640).

If the outgoing telecommunications are not to be provided by a PSTN, then the communications unit can isolate the PSTN from the building telephone wiring (650). Such isolation of the PSTN can be performed automatically by placing, for example, switch 410 in an open state as illustrated and discussed above with regard to FIG. 4. Isolation of the PSTN from the building wiring in this manner prevents signals and voltages from the building wiring to enter the PSTN network.

The configuration data is then reviewed to determine whether outgoing communication is to be via VOIP (660). If VOIP is the chosen outgoing communication method, then analog signals received from the building telephone wiring are provided to an ATA for conversion to digital signals (670). In communication unit 400 illustrated above, the ATA is integral with Communications Processor/ATA 430. The digital signals are then provided to a network interface for transmission over a broadband connection (680). If the outgoing communication is not by VOIP, then the analog signals can be provided to a cellular interface for conversion and transmission over a cellular network (690).

Any configuration of a communications unit for a particular outgoing telecommunications mode can remain in place until a new set of configuration data is received by the communications unit indicating that a different telecommunications mode should be provided. Configuration information can be stored, for example, in a nonvolatile memory coupled to Communication Processor/ATA 430. In addition, although the above figures and discussion provides PSTN, VOIP, and cellular as alternate telecommunications modes, it should be recognized that these modes are provided as examples and that embodiments of the present invention are not limited to providing just the three telecommunications modes discussed above. Various types of analog signal conversion mechanisms can be provided to a communications unit 400 and either be integrated with a Communication Processor/ATA 430 or coupled thereto.

Other Embodiments

The present invention is well adapted to attain the advantages mentioned as well as others inherent therein. While the present invention has been depicted, described, and is defined by reference to particular embodiments of the present invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

The foregoing describes embodiments including components contained within other components (e.g., the various elements shown as components of communications unit 210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected" or "operably coupled" to each other to achieve the desired functionality.

The foregoing detailed description has set forth various examples of the present invention via the use of block diagrams, flow charts, and examples. It will be understood by those within the art that each block diagram component, flow chart step, operation and/or component illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalence in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
  a processor coupled to a security system and configured to receive information from the security system;
  a first interface to a public switched telephone network (PSTN) coupled to a first switch configured to be controlled by the processor;
  a second interface to a building telephone wiring coupled to the first switch and a second switch, wherein the processor is configured to isolate the building telephone wiring from the PSTN by placing the switch in an open state in response to the processor receiving communication configuration information, wherein the processor is configured to couple the building telephone wiring to the processor by placing the second switch in the closed state in response to the processor receiving the communication configuration information; and
  a network interface coupled to the processor and coupled to a network and configured to receive communication configuration information from a remote server located external to the building and coupled to the network, wherein the processor is further configured to transmit the information from the security system to the remote server using a selected one of the network interface, the first interface, and a cellular interface coupled to the processor.

2. The apparatus of claim 1, comprising:
  an analog telephone adapter (ATA) configured to convert information in analog signals received by the second interface for transmission on the network; and
  the network interface is coupled to the ATA and is configured to transmit the converted information on the network.

3. The apparatus of claim 1, comprising the cellular interface coupled to the second interface and configured to transmit information provided in analog signals received by the second interface to a cellular network.

4. The apparatus of claim 1, wherein the processor is configured to convert the information received from the security system to a form appropriate for the selected transmission interface.

5. An apparatus comprising:
  a first interface to a public switched telephone network (PSTN);
  a second interface to a building telephone wiring;
  means for receiving communication configuration information from a network, wherein the communication information is transmitted by a remote server located external to the building;
  means for converting information in analog signals received by the second interface for transmission on a network;
  means for automatically isolating the building telephone wiring from the PSTN, wherein the isolating is performed in response to the communication configuration information;
  means for automatically coupling the building telephone wiring to the means for converting, wherein the coupling is performed in response to the communication configuration information;
  means for receiving information from a security system; and
  means for transmitting the information from the security system to the remote server using one of an interface to the network, the first interface, and a means for transmitting to a cellular network.

6. The apparatus of claim 5, comprising means for transmitting the converted signals to the network.

7. The apparatus of claim 5, comprising means for transmitting information contained in analog signals received by the second interface to a cellular network.

* * * * *